US008073729B2

(12) United States Patent
Kisin et al.

(10) Patent No.: US 8,073,729 B2
(45) Date of Patent: Dec. 6, 2011

(54) FORECASTING DISCOVERY COSTS BASED ON INTERPOLATION OF HISTORIC EVENT PATTERNS

(75) Inventors: Roman Kisin, San Jose, CA (US); Pierre Raynaud-Richard, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 12/242,478

(22) Filed: Sep. 30, 2008

(65) Prior Publication Data

US 2010/0082382 A1 Apr. 1, 2010

(51) Int. Cl.
G06Q 10/00 (2006.01)
G06F 17/00 (2006.01)
G06G 7/00 (2006.01)

(52) U.S. Cl. ............... 705/7.35; 705/7.29; 705/7.11; 705/400

(58) Field of Classification Search ............... 705/7
See application file for complete search history.

(56) References Cited

U.S. PATENT DOCUMENTS

| | | |
|---|---|---|
| 5,355,497 A | 10/1994 | Cohen-Levy |
| 5,608,865 A | 3/1997 | Midgely et al. |
| 5,701,472 A | 12/1997 | Koerber et al. |
| 5,903,879 A | 5/1999 | Mitchell |
| 6,115,642 A | 9/2000 | Brown et al. |
| 6,128,620 A | 10/2000 | Pissanos et al. |
| 6,151,031 A | 11/2000 | Atkins et al. |
| 6,173,270 B1 | 1/2001 | Cristofich et al. |
| 6,330,572 B1 | 12/2001 | Sitka |
| 6,332,125 B1 | 12/2001 | Callen et al. |
| 6,343,287 B1 | 1/2002 | Kumar et al. |
| 6,401,079 B1 | 6/2002 | Kahn et al. |
| 6,425,764 B1 | 7/2002 | Lamson |
| 6,539,379 B1 | 3/2003 | Vora et al. |
| 6,607,389 B2 | 8/2003 | Genevie |
| 6,622,128 B1 | 9/2003 | Bedell et al. |
| 6,738,760 B1 | 5/2004 | Krachman |
| 6,805,351 B2 | 10/2004 | Nelson |
| 6,832,205 B1 * | 12/2004 | Aragones et al. ............ 705/7.25 |
| 6,839,682 B1 * | 1/2005 | Blume et al. ................. 705/7.31 |
| 6,944,597 B2 | 9/2005 | Callen et al. |
| 6,976,083 B1 | 12/2005 | Baskey et al. |
| 7,076,439 B1 | 7/2006 | Jaggi |
| 7,103,602 B2 | 9/2006 | Black et al. |
| 7,104,416 B2 | 9/2006 | Gasco et al. |
| 7,107,416 B2 | 9/2006 | Stuart et al. |

(Continued)

OTHER PUBLICATIONS

PSS Systems, Inc., "Industry Leader PSS Systems Launches Third Generation of Atlas Legal Hold and Retention Management Software", pp. 1-2, www.pss-systems.com (Aug. 2007).*

(Continued)

Primary Examiner — Jason Dunham
Assistant Examiner — Richard Scheunemann
(74) Attorney, Agent, or Firm — Michael A. Glenn; Glenn Patent Group

(57) ABSTRACT

A computer-implemented method of forecasting discovery costs captures historical business events, which are aggregated and statistically analyzed by matter type and business event types. Statistical data is used to calculate probabilities of occurrence of future business events and to extrapolate occurrence of those future business events. The method forecasts an extrapolated volume of production at the time of a forecasted export event. The method further forecasts costs for future discovery from the extrapolated volume of production.

19 Claims, 8 Drawing Sheets

U.S. PATENT DOCUMENTS

| | | | |
|---|---|---|---|
| 7,127,470 | B2 | 10/2006 | Takeya |
| 7,162,427 | B1 | 1/2007 | Myrick et al. |
| 7,197,716 | B2 | 3/2007 | Newell |
| 7,225,249 | B1 | 5/2007 | Barry et al. |
| 7,281,084 | B1 | 10/2007 | Todd et al. |
| 7,283,985 | B2 | 10/2007 | Schauerte et al. |
| 7,284,985 | B2 | 10/2007 | Genevie |
| 7,333,989 | B1 | 2/2008 | Sameshima et al. |
| 7,386,468 | B2 | 6/2008 | Calderaro et al. |
| 7,433,832 | B1 | 10/2008 | Bezos et al. |
| 7,478,096 | B2 | 1/2009 | Margolus et al. |
| 7,502,891 | B2 | 3/2009 | Shachor |
| 7,512,636 | B2 | 3/2009 | Verma et al. |
| 7,558,853 | B2 | 7/2009 | Alcorn et al. |
| 7,580,961 | B2 | 8/2009 | Todd et al. |
| 7,594,082 | B1 | 9/2009 | Kilday et al. |
| 7,596,541 | B2 | 9/2009 | deVries et al. |
| 7,720,825 | B2 | 5/2010 | Pelletier et al. |
| 7,730,148 | B1 | 6/2010 | Mace et al. |
| 7,895,229 | B1 | 2/2011 | Paknad |
| 2001/0053967 | A1 | 12/2001 | Gordon et al. |
| 2002/0007333 | A1 | 1/2002 | Scolnik et al. |
| 2002/0010708 | A1 | 1/2002 | McIntosh |
| 2002/0022982 | A1 | 2/2002 | Cooperstone et al. |
| 2002/0035480 | A1 | 3/2002 | Gordon et al. |
| 2002/0083090 | A1 | 6/2002 | Jeffrey et al. |
| 2002/0091553 | A1 | 7/2002 | Callen et al. |
| 2002/0095416 | A1 | 7/2002 | Schwols |
| 2002/0103680 | A1 | 8/2002 | Newman |
| 2002/0108104 | A1 | 8/2002 | Song et al. |
| 2002/0119433 | A1 | 8/2002 | Callender |
| 2002/0120859 | A1 | 8/2002 | Lipkin et al. |
| 2002/0123902 | A1 | 9/2002 | Lenore et al. |
| 2002/0143595 | A1 | 10/2002 | Frank et al. |
| 2002/0143735 | A1 | 10/2002 | Ayi et al. |
| 2002/0147801 | A1 | 10/2002 | Gullotta et al. |
| 2002/0162053 | A1 | 10/2002 | Os |
| 2002/0178138 | A1 | 11/2002 | Ender et al. |
| 2002/0184068 | A1 | 12/2002 | Krishnan et al. |
| 2002/0184148 | A1 | 12/2002 | Kahn et al. |
| 2003/0004985 | A1 | 1/2003 | Kagimasa et al. |
| 2003/0014386 | A1 | 1/2003 | Jurado |
| 2003/0018520 | A1 | 1/2003 | Rosenfeld et al. |
| 2003/0031991 | A1 | 2/2003 | Genevie |
| 2003/0033295 | A1 | 2/2003 | Adler et al. |
| 2003/0036994 | A1 | 2/2003 | Witzig et al. |
| 2003/0046287 | A1 | 3/2003 | Joe |
| 2003/0051144 | A1 | 3/2003 | Williams |
| 2003/0069839 | A1 | 4/2003 | Whittington et al. |
| 2003/0074354 | A1 | 4/2003 | Lee et al. |
| 2003/0097342 | A1 | 5/2003 | Whittington |
| 2003/0110228 | A1 | 6/2003 | Xu et al. |
| 2003/0139827 | A1 | 7/2003 | Phelps |
| 2003/0229522 | A1 | 12/2003 | Thompson et al. |
| 2004/0002044 | A1 | 1/2004 | Genevie |
| 2004/0019496 | A1* | 1/2004 | Angle et al. ............ 705/1 |
| 2004/0034659 | A1 | 2/2004 | Steger |
| 2004/0060063 | A1 | 3/2004 | Russ et al. |
| 2004/0068432 | A1 | 4/2004 | Meyerkopf et al. |
| 2004/0088283 | A1 | 5/2004 | Lissar et al. |
| 2004/0088332 | A1 | 5/2004 | Lee et al. |
| 2004/0088729 | A1 | 5/2004 | Petrovic et al. |
| 2004/0103284 | A1 | 5/2004 | Barker |
| 2004/0133573 | A1 | 7/2004 | Miloushev et al. |
| 2004/0138903 | A1 | 7/2004 | Zuniga |
| 2004/0143444 | A1 | 7/2004 | Opsitnick et al. |
| 2004/0187164 | A1 | 9/2004 | Kandasamy et al. |
| 2004/0193703 | A1 | 9/2004 | Loewy et al. |
| 2004/0204947 | A1 | 10/2004 | Li et al. |
| 2004/0215619 | A1 | 10/2004 | Rabold |
| 2004/0260569 | A1 | 12/2004 | Bell et al. |
| 2005/0060175 | A1 | 3/2005 | Farber et al. |
| 2005/0071251 | A1 | 3/2005 | Linden et al. |
| 2005/0074734 | A1 | 4/2005 | Randhawa |
| 2005/0114241 | A1 | 5/2005 | Hirsch et al. |
| 2005/0144114 | A1 | 6/2005 | Ruggieri et al. |
| 2005/0165734 | A1 | 7/2005 | Vicars et al. |
| 2005/0187813 | A1 | 8/2005 | Genevie |
| 2005/0203821 | A1 | 9/2005 | Petersen et al. |
| 2006/0036464 | A1 | 2/2006 | Cahoy et al. |
| 2006/0036649 | A1 | 2/2006 | Simske et al. |
| 2006/0074793 | A1 | 4/2006 | Hibbert et al. |
| 2006/0095421 | A1 | 5/2006 | Nagai et al. |
| 2006/0126657 | A1 | 6/2006 | Beisiegel et al. |
| 2006/0136435 | A1 | 6/2006 | Nguyen et al. |
| 2006/0143248 | A1 | 6/2006 | Nakano et al. |
| 2006/0149735 | A1 | 7/2006 | DeBie et al. |
| 2006/0156381 | A1 | 7/2006 | Motoyama |
| 2006/0167704 | A1* | 7/2006 | Nicholls et al. ............ 705/1 |
| 2006/0174320 | A1 | 8/2006 | Maru et al. |
| 2006/0184718 | A1 | 8/2006 | Sinclair |
| 2006/0229999 | A1* | 10/2006 | Dodell et al. ............ 705/80 |
| 2006/0230044 | A1 | 10/2006 | Utiger |
| 2007/0016546 | A1 | 1/2007 | DeVorchik et al. |
| 2007/0048720 | A1 | 3/2007 | Billauer |
| 2007/0061156 | A1 | 3/2007 | Fry et al. |
| 2007/0061157 | A1 | 3/2007 | Fry et al. |
| 2007/0078900 | A1 | 4/2007 | Donahue |
| 2007/0099162 | A1 | 5/2007 | Sekhar |
| 2007/0100857 | A1 | 5/2007 | DeGrande et al. |
| 2007/0112783 | A1 | 5/2007 | McCreight et al. |
| 2007/0156418 | A1 | 7/2007 | Richter et al. |
| 2007/0162417 | A1 | 7/2007 | Cozianu et al. |
| 2007/0208690 | A1 | 9/2007 | Schneider et al. |
| 2007/0219844 | A1 | 9/2007 | Santorine et al. |
| 2007/0220435 | A1 | 9/2007 | Sriprakash et al. |
| 2007/0271517 | A1 | 11/2007 | Finkelman et al. |
| 2007/0282652 | A1 | 12/2007 | Childress et al. |
| 2007/0288659 | A1 | 12/2007 | Zakarian et al. |
| 2008/0033904 | A1 | 2/2008 | Ghielmetti et al. |
| 2008/0034003 | A1 | 2/2008 | Stakutis et al. |
| 2008/0059265 | A1* | 3/2008 | Biazetti et al. ............ 705/8 |
| 2008/0059543 | A1 | 3/2008 | Engel |
| 2008/0070206 | A1 | 3/2008 | Perilli |
| 2008/0148346 | A1 | 6/2008 | Gill et al. |
| 2008/0195597 | A1 | 8/2008 | Rosenfeld et al. |
| 2008/0229037 | A1 | 9/2008 | Bunte et al. |
| 2008/0294674 | A1 | 11/2008 | Reztlaff et al. |
| 2008/0301207 | A1 | 12/2008 | Demarest et al. |
| 2008/0319958 | A1 | 12/2008 | Bhattacharya et al. |
| 2008/0319984 | A1 | 12/2008 | Proscia et al. |
| 2009/0037376 | A1 | 2/2009 | Archer et al. |
| 2009/0043625 | A1* | 2/2009 | Yao ............ 705/7 |
| 2009/0106815 | A1 | 4/2009 | Brodie et al. |
| 2009/0119677 | A1 | 5/2009 | Stefansson et al. |
| 2009/0150866 | A1 | 6/2009 | Schmidt |
| 2009/0150906 | A1 | 6/2009 | Schmidt et al. |
| 2009/0193210 | A1 | 7/2009 | Hewett et al. |
| 2010/0070315 | A1* | 3/2010 | Lu et al. ............ 705/7 |

OTHER PUBLICATIONS

Human Capital Mangement; "mySAP . . . management"; retrieved from archive.org Aug. 18, 2009 www.sap.com.

www.pss-systems.com; retrieved from www.Archive.org any linkage dated Dec. 8, 2005, 130 pages.

PSS Systems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

PSS Systems, Inc., Preservation Benchmarks for 2007 and Beyond, www.pss-systems.com, pp. 1-3 (2007).

PSS Systems, Inc., Litigation Communications and Collections, www.pss-systems.com (2006), retrieved online on Dec. 8, 2010 from archive.org, 1 page.

Zhu, et al.; "Query Expansion Using Web Access Log Files"; Lecture Notes in Computer Science, 2005, vol. 3588/2005, pp. 686-695, Springer-Verlag Berlin Hedelberg.

* cited by examiner

```
                        ┌─302
Likelihood of production:  [7      ] %
Duration before first export: 10%:   [ ] years [3] months [17] days  ⎫
                            Average: [ ] years [6] months [5]  days  ⎬─304
                            90%      [2] years [3] months [12] days  ⎭

Volumes of export per:    Datasource          Custodian
                        ⎧ 10%:    [ ] MB      10%:    [ ] MB   ⎫
                 306───⎨  Average: [ ] MB      Average: [ ] MB   ⎬─308
                        ⎩ 90%     [ ] MB      90%     [ ] MB   ⎭

Culling rate:   310──[36.3    ] %
```

FIG. 8

```
                              ┌─320
                                              ┌─322
Likelihood of production:   32.8 %      [✓] [65        ] %
Estimated date of production: 08/17/08  [✓] [       ▣]─324
Estimated custodians:       127         [ ] [         ]─326
Estimated data sources:     23          [ ] [         ]─328
Estimated volume:           397.6 GB    [ ] [         ]─330
Estimated total cost:       $842,623.00 [ ] [         ]─332
```

FIG. 9

FORECASTING DISCOVERY COSTS BASED ON INTERPOLATION OF HISTORIC EVENT PATTERNS

BACKGROUND OF THE INVENTION

1. Field of the Invention

This invention relates to methods and apparatus for forecasting litigation discovery costs by collecting and analyzing historic data to predict future costs and timing based on interpolation of historic event patterns.

2. Prior Art

Because of the increasing cost of litigation discovery, litigation expenses are increasing in both absolute dollars and as a percentage of operating budgets for some companies. It is difficult to predict discovery costs on a matter-by-matter basis when the outcome of any individual litigation matter cannot be accurately predicted. The amount and timing of discovery expenses can have a material impact on a company's operating results.

Previously, forecasting methods for E*Discovery costs were very ad hoc and manual. Only limited data could be leveraged because there was no effective means to collect and mine historical data and no effective way to track detailed recent activity on current matters. As a result, forecasts were made using empirical forecasting methods that were based more often on perception of cost trends rather than on real data, using simple models that were implemented using manual spreadsheet formulas. Consistency and accuracy was extremely low. As a result, such forecasts were not relied upon for budgeting purposes. Instead, budgets were developed using simple year-to-year trends combined with intuitive guesses.

Given the volume of current litigation in large corporations, the number of people possessing information related to each matter in litigation, and the widespread use of third party contractors, who provide discovery services, it is difficult to develop and maintain accurate cost forecasts without a dedicated cost-forecasting tool. To enable companies to more accurately an effectively forecast their legal expenses, automated methodology and process for predicting discovery costs is needed. Important attributes of an effective model for forecasting discovery costs are ease of use, flexibility, and data integrity. The model should enable a person with little or no training in finance to produce a forecast that he/she is confident delivering to the company's management team. The key to having confidence in the forecast is knowing that the data used to create the forecast is complete and specific to the company and was collected in a way that minimizes the risk of human error.

The concept of a particular litigation matter moving through a particular series of sequential stages may not be entirely sufficient for modeling more sophisticated business litigation processes. For example, it is desirable that a second request with collections be created at any time, not necessarily after a particular stage. Ad-hoc collection logs may need to be created before a collection notice is created. These out-of-order events increase the probability of collection but are not properly modeled using sequential litigation stages model.

SUMMARY OF THE INVENTION

The present invention uses historic data and probability based forecasting to forecast future discovery matters, events, timing, and costs. The present invention automates the process of collecting and statistically analyzing historic data on litigation to predict future outcomes and costs. The present invention provides pre-configured reports on projected discovery costs. The present invention provides for collection of data from multiple software applications to enable statistical analysis of various variables used to forecast discovery events and expenses.

The present invention provides a flexible business-event based probabilistic model with a number of features for forecasting future discovery costs. The present invention also provides a litigation business-event representation model to capture the volume and the temporal characteristics of a business event. The present invention also provides litigation event filtering and weighting to improve forecasting accuracy. The present invention provides a sophisticated covariance model to quantify temporal correlation between business events. The present invention also provides for automating the process of collecting and analyzing historic data on litigation to predict future outcomes and costs. The present invention also provides for collecting data from multiple data sources to enable analysis of all of the variables necessary to forecast discovery costs.

A computer-implemented method is provided for forecasting litigation discovery costs for a litigation matter that includes a number of business events. The method includes capturing historical business events for the litigation matter; aggregating and statistically analyzing the captured historical business events by matter type, time period, and business event type to produce statistical data specific to a time period; aggregating the statistical data for matter type and event type; extrapolating future business events using the statistical data provided by the statistical analysis to calculate probabilities of occurrence of future business events; forecasting an extrapolated volume of production at the time of a forecasted export event; and forecasting costs for future discovery from the extrapolated volume of production.

The statistical data includes Export Lag, which is the statistical distribution of the duration from an occurrence of a given event to an export event. The statistical data includes a statistical distribution export lag for event types within the matter type expressed by a statistical model using one or more predetermined percentiles. A probability is provided for export, which is the likelihood of the export event occurring after an event of a given type has occurred in the context of a legal matter. One embodiment of the invention provides that the statistical data includes a statistical model using $10^{th}$, $50^{th}$, $90^{th}$ percentiles.

The statistical data for matter type and event type is aggregated across multiple fiscal periods to provide trend and seasonal analysis. Aggregating and statistically analyzing the captured historical business events by matter type and business event types produces statistical data that includes event weighting in which recent data is weighed more heavily that older data. Producing the statistical data includes event filtering that discards events with values outside of an acceptable range and events from the matters identified as abnormal. Extrapolating future business events includes exponential smoothing in which recent events are given relatively more weight in forecasting than older events.

Forecasting an extrapolated volume of production at the time of a forecasted export event includes: forecasting the number of custodians and data sources involved in collections based on the actual number of custodians and data sources in the scope of the matter; computing the probability of the export within the forecasting period based on the historical event patterns, applying typical collection size per custodian and data source; estimating typical make up of the collection in terms of file types; applying typical collection-to-export volume ratio to estimate the volume of export; and applying a gigabyte per page mapping to the collected volume according to the collection make up ratio to estimate the size of the export in pages.

Forecasting costs for future discovery from the extrapolated volume of production includes applying a culling rate and average review cost. The method includes calibrating by making provisions and adjustments to one or more parameters of a forecasting model.

The method includes performing matter cost modeling for various scenarios by adjusting parameters of a forecasting model. The method includes creating reports for forecasting an extrapolated volume of production at the time of a forecasted export event. The method includes creating reports for forecasting costs for future discovery from the extrapolated volume of production as well as creating reports for forecasting costs for future discovery from an extrapolated volume of production.

Some other examples of statistical data include the number of custodians and data sources in the scope of the legal matter, number of custodians involved in collections and volume collected from both custodians and data sources, timing and number of other various events that help characterize how advanced the legal matter may be in its lifecycle, like existence of one or may request documents, publication of legal hold notices, etc.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 8 illustrates a user interface having a data-display/entry screen that enables a user to manually adjust parameters of a prediction model.

FIG. 9 illustrates a user interface having a data-display/entry screen that enables a user to manually adjust parameters of an individual matter.

DETAILED DESCRIPTION OF THE PREFERRED EMBODIMENTS

Reference is now made in detail to preferred embodiments of the invention, examples of which are illustrated in the accompanying drawings. While the invention is described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
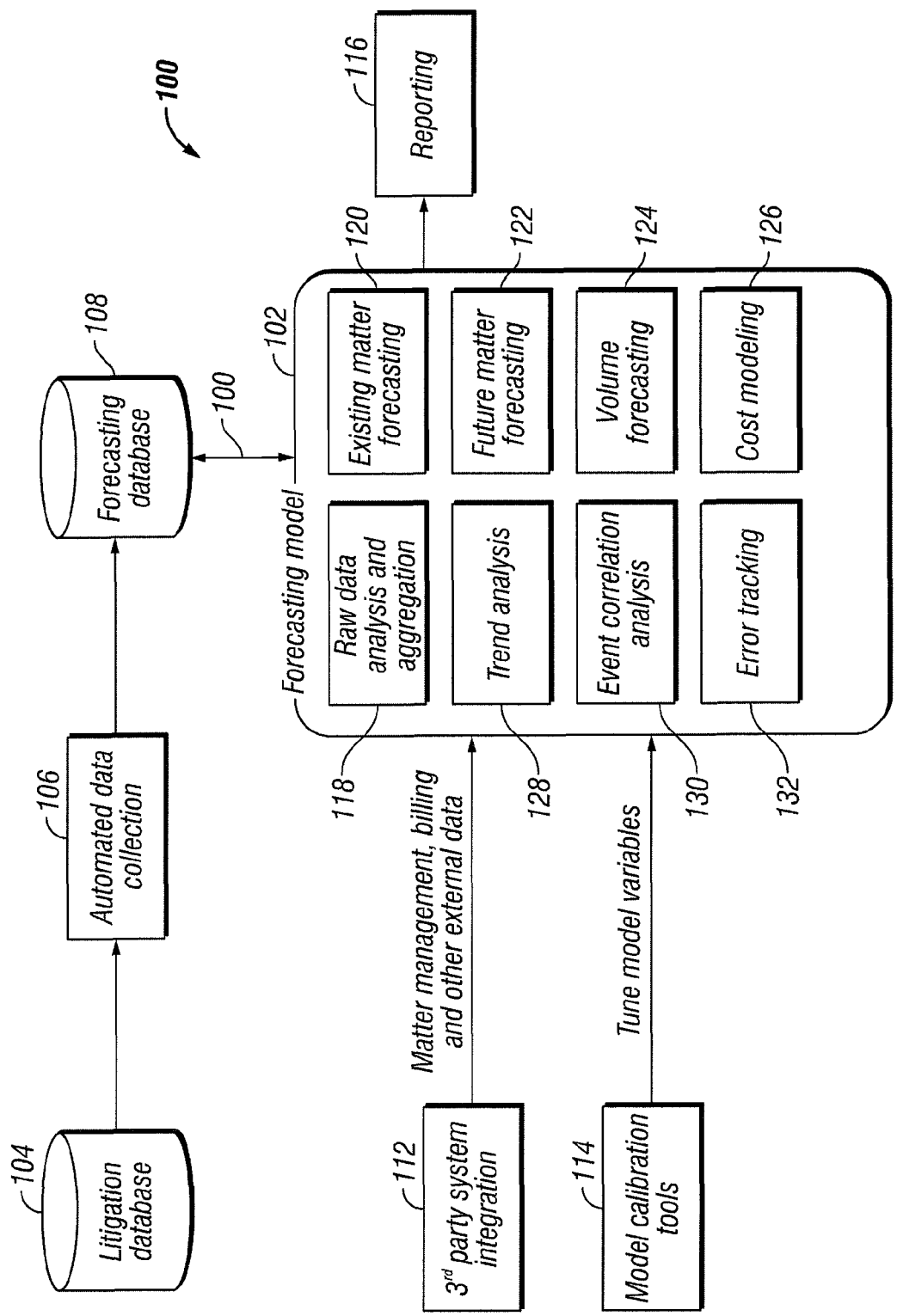
FIG. 1 is a diagram illustrating a computer-implemented method for forecasting discovery costs using historic data.

FIG. 1 is a high level flow system diagram 100 that provides an overview of a forecasting model, or forecasting engine (FE), 102. The forecasting model uses various modules to implement six steps of a forecasting method. STEP 1 gathers historical raw business event information. STEP 2 statistically analyzes the event information. STEP 3 calculates a statistical data matrix for matter types. STEP 4 calculates a statistical data matrix for existing matters. STEP 5 extrapolates future events including time lag to export and volume of production. STEP 6 forecasts costs.

The forecasting model is based on recognizing business event patterns and their interpolation into the future. Various business events occur during the lifecycle of the matter and include both internal and external events. Internal events are those events that can be extracted from a litigation knowledge base. Some examples of internal events (identified with alphabetical labels) gathered in STEP 1 include but are not limited to: A—legal matters created; R—legal requests created; P—persons added to scope; D—data sources added to scope; H—hold notices created; CP—collection plans created; C—collection logs created; Ex—external events occurred; V—virtual interviews created; I—interview logs created; E—exports occurred; and F—matters finished.

Some examples of external events are those events that occur in third party systems and applications. Examples of external events include events occurring in a corporate matter management system, events routed from an outside council system, a billing system, etc. External events include, but are not limited to the following: fee/invoice tracking events; Integration with third party matter management systems; and project management events.

A litigation database 104 for STEP 1 provides relevant data to an automated data collection module 106. A forecasting database 108 for STEP 1 receives input from the automated data collection module 106. The forecasting data base 108 also has an input/output (I/O) port 100 that communicates with the forecasting module 102. A third party system module 112 provides outside information to the forecasting model 102 including matter management information, billing information, and other external data, as required. A model calibration tools module 114 provides various calibration tools for tuning model variables in the forecasting model 102. A reporting module 116 receives information from the forecasting module 102 to provide various reports to users.

A raw data analysis and aggregation module 118 performs STEP 2 to provide for each matter type statistical analysis of data for each of the six steps. This statistical analysis provides for each step of a particular matter type and event type the following values: statistical distribution of Export Lag, in days, from a first occurrence. It also includes the statistical distribution of the number of custodians involved in collections and volume collected from both custodians and data sources. In one embodiment of the invention, any such statistical distribution may be represented throughout the invention using the $10^{th}$, $50^{th}$, and $90^{th}$ percentiles of the distribution. Such a mode is further refined to increase accuracy.

An existing matter forecasting module 120 performs STEP 3 that extrapolates progress for known existing matters. A future matter forecasting module 122 performs STEP 4 by forecasting how many new matters are likely to occur over the duration of a forecasting period. The forecasting module 122 also extrapolates the average progress that matters are likely to experience within the forecast period. A volume production forecasting module 124 performs STEP 5 by extrapolating quantitative characteristics of the material to be collected and calculates expected export volumes. A cost modeling module 126 performs STEP 6 by using the extrapolated collection volume previously calculated and applying a culling rate and average estimated review cost. A trend analysis module 128 analyzes historical data to determine if longer term trends occur and if seasonal or cyclical patterns occur. An event correlation analysis module 130 analyzes patterns of litigation events in order to establish important relationships between the events and to improve accuracy of the forecasts. An error tracking module 132 for costs compares forecasted cost to actual costs and makes appropriate changes to calibrate the forecasting module with historical data.

In the gathering stage of STEP 1, the present invention gathers, or collects, historical business-event data using automated methods from the litigation database and other data sources. The data is gathered into a forecasting database where it goes through multiple processing stages including aggregation and refinement. Legal matters of a given matter type tend to have similar characteristics so that the method groups the gathered data by matter types. The data is basically a sequence of business events pertaining to legal matters. Most of the events have a Matter ID and a Timestamp associated therewith. A Matter ID identifies that an event has occurred in the context of a legal matter identified by the Matter ID. A Timestamp identifies an event as having occurred at a specified date/time. Business events may also contain additional information, based on their type. For example, a "Collection Log Created" event contains additional information, such as the volume of collected data in gigabytes (GB). Due to the high volume of data gathered as well as unavoidable occurrences of various exceptional cases that are statistical anomalies, there is a need for an automated procedure that cleans, so to speak, the data in order to reduce the statistical noise, or misleading information, from such anomalies. For example, a given matter could be explicitly or automatically selected as being "exceptional" and be excluded from historical trends. Automatic selection can be based, for example, on a definition of normal expected ranges for key matter metrics and how far any given matter deviates from those ranges. Potential errors are reduced by identifying those exceptional events that fall beyond typical values and that are characterized as being so abnormal they should not be used for calculating historical trends.

In STEP 2, the historical data is inputted to a quantitative timing forecasting model. The function of the forecasting model is to predict the timing, volume, and likelihood of occurrence of an export event, where the bulk of the costs are incurred. The likelihood of future occurrences is based on knowledge of when certain events have occurred to date. The forecasting model recognizes business event patterns. The forecasting model also recognizes various trends in the patterns of historical events and is capable of adjusting the forecast accordingly. A few business events have more significance than others. To predict the likelihood and timing of export, most events can be used as reference information. However, only certain events having certain additional parameters, such as collection logs with specific collection volumes that enable prediction of the volume of exports. The forecast model also provides several additional stages including: business event filtering and cleaning; event data transformation; temporal probabilistic event correlation; trend analysis; future event forecasting; estimating volume of the future exports; applying culling and other adjustments to the forecasted volume; estimating discovery costs; evaluating forecast accuracy; and model calibration.

Once the modeling is complete, the results are presented in a way that is easy to understand and that provide visibility into how results were estimated and with what accuracy level. This is key to enabling fast and simple user calibration. All forecasting models require that their end-user be able to calibrate interpretation of the outputs of the model in order to provide adjustment for any needed correction factors, and in order to build confidence that the model is indeed reliable. By providing transparency on how the model works and by allowing an end user to see and potentially adjust intermediate forecasts within the model that are easy to understand and validate, the implementation of the forecast model can be easier to use and faster to be adopted by end users. The proposed forecasting model and software solution relies on a set of technologies that enable high levels of forecasting accuracy while maintaining simplicity and ease of use. The software is built around a forecast engine (FE) which provides a foundation for reliable forecasting. The forecast engine uses historical data as the basis for estimating future discovery costs. The methods used for discovery costs forecasting are based on the statistical information and can be classified as a subset of time-series forecasting methods, also known as time-domain methods. The FE makes forecasts based on the patterns in the historical events and their correlation in time.

Historical litigation data typically shows a consistent pattern of events that are expected to recur in the future.

The FE models the following components when analyzing historical data pertaining to the various types of legal matters: trends, cyclical events, seasonal events, and irregular events. Regarding trends, while the number of new legal matters fluctuates month to month and from one quarter to another, historical data gathered over a long period of time may show that the number of litigations per quarter tends to increase over time. Cyclical events are those events in a repeating sequence of events that lasts for more than a year. Seasonal events capture the regular pattern of variability in an event time series within a one-year period, in which the number of new litigations may show, for example, a significant decrease during the summer time or a major holiday and an increase at the beginning of the New Year quarter. Irregular events represent random variations in the occurrence of events that are triggered by random factors.

A critical aspect of cost forecasting is insuring the consistency and accuracy of the collected data. In order to minimize the possibility of human error and to increase overall reliability, historical data is collected as automatically as possible. Events are aggregated by matter types to enable more precise cost forecasting in subsequent stages. One implementation of the forecasting method automatically captures and summarizes business events, using the most reliable historical data available. It is assumed that almost all legal matters and all collection processes are managed and tracked through a single application that can aggregate all this information into a single knowledge base. The forecasting method and apparatus has access to that knowledge base, and consequently possess very large amounts of historical data pertaining to the majority of legal matters in a company. This captured data is highly reliable and accurate and improves the accuracy of the overall forecasting model. Legal matters are typically categorized into various types. For example, a legal department can choose to categorize matters into types such as employment, securities, etc. Different matter types are characterized by potentially widely dispersed historical data parameters.

An illustrative example of the methodology of the forecasting model is described below. The forecasting model is based on an iterative approach and includes, for example, STEPS 1 through 6. The method provides a general business-event based discovery cost forecasting framework that uses a number of forecasting algorithms. The approach described below is an example of an algorithm based on extrapolation, where the data for historic events is analyzed and decomposed into current levels, trends, and cycles. The current levels are determined by summarizing the collected events and their statistical properties.

For simplicity, the principles and equations used by the forecasting model are illustrated below with a small number of legal matters. In reality and depending upon the number of legal matters, there is likely to be hundreds, thousands, if not tens of thousands of legal matters.

Capturing Historical Data (Step 1)

Table 1 an example of the historical raw business events that are gathered or captured for a single matter. Each data entry is listed as an employment type with a matter ID, an event type, and a date timestamp.

TABLE 1

| Matter Type | Matter | Event Type | Timestamp |
|---|---|---|---|
| Employment | 04-1234 | A | Nov. 4, 2006 |
| Employment | 04-1234 | R | Nov. 11, 2006 |
| Employment | 04-1234 | P | Nov. 12, 2006 |
| Employment | 04-1234 | Px | Nov. 13, 2006 |
| Employment | 04-1234 | Px | Nov. 14, 2006 |
| Employment | 04-1234 | Px | Nov. 15, 2006 |
| Employment | 04-1234 | D | Nov. 16, 2006 |
| Employment | 04-1234 | H | Nov. 22, 2006 |
| Employment | 04-1234 | C | Jan. 5, 2007 |
| Employment | 04-1234 | Ext | Jan. 6, 2007 |
| Employment | 04-1234 | V | Feb. 3, 2007 |
| Employment | 04-1234 | C | Mar. 8, 2007 |
| Employment | 04-1234 | CP | Apr. 9, 2007 |
| Employment | 04-1234 | Cx | Apr. 10, 2007 |
| Employment | 04-1234 | Cx | Apr. 19, 2007 |
| Employment | 04-1234 | Cx | Apr. 28, 2007 |
| Employment | 04-1234 | Cx | May 7, 2007 |
| Employment | 04-1234 | Cx | May 16, 2007 |
| Employment | 04-1234 | Cx | May 25, 2007 |
| Employment | 04-1234 | Cx | Jun. 3, 2007 |
| Employment | 04-1234 | Cx | Jun. 12, 2007 |
| Employment | 04-1234 | Cx | Jun. 21, 2007 |
| Employment | 04-1234 | Cx | Jun. 30, 2007 |
| Employment | 04-1234 | Cx | Jul. 9, 2007 |
| Employment | 04-1234 | Cx | Jul. 18, 2007 |
| Employment | 04-1234 | Dx | Sep. 19, 2007 |
| Employment | 04-1234 | Rx | Sep. 20, 2007 |
| Employment | 04-1234 | Px | Oct. 21, 2007 |
| Employment | 04-1234 | E | Nov. 22, 2007 |
| Employment | 04-1234 | F | Jan. 23, 2008 |

Figure 2:
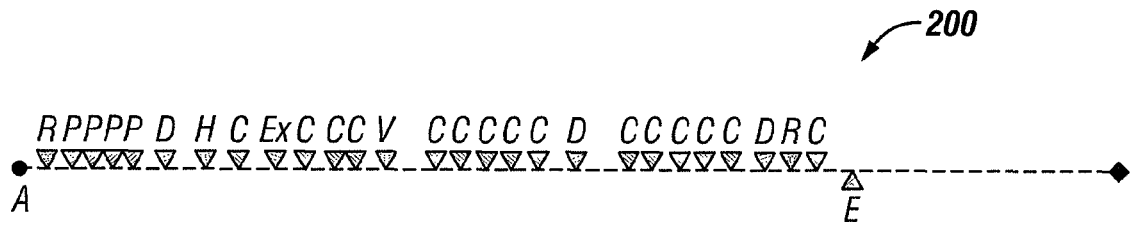
FIG. 2 is a life-cycle diagram illustrating a set of captured historical raw business events for a single legal matter.
Figure 3:
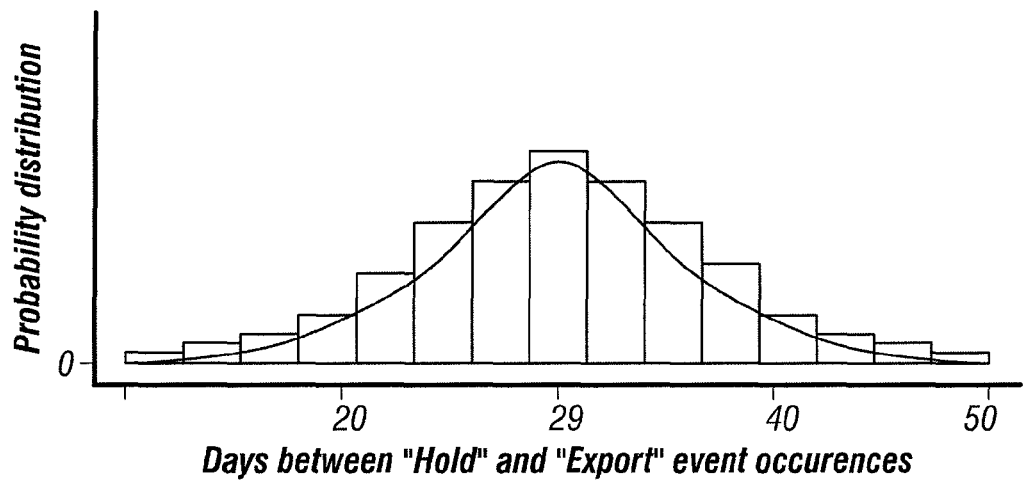
FIG. 3 is histogram illustrating the probability distribution for the number of days between the occurrence of hold and export events.
Figure 4:
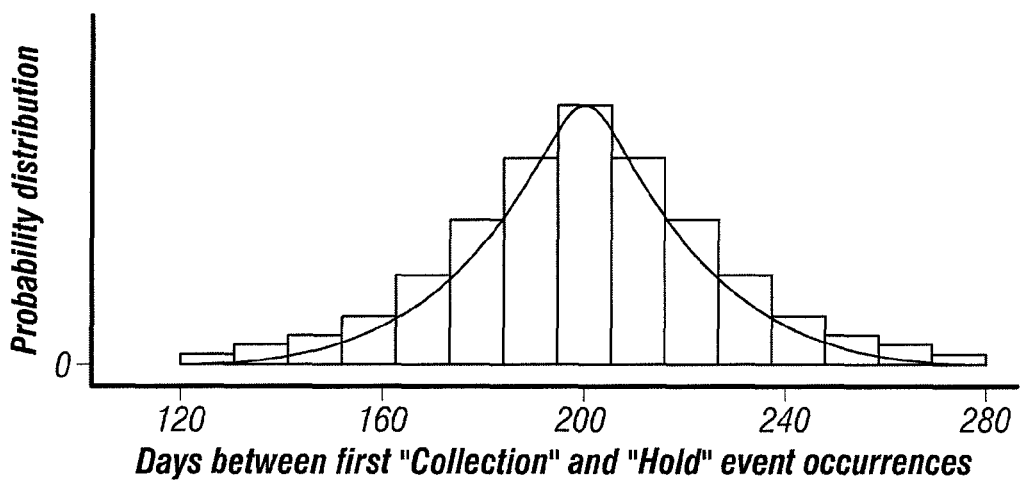
FIG. 4 is another histogram illustrating the probability distribution for the number of days between the occurrence of first collection and hold events.

FIG. 2 is a life-cycle diagram 200 showing an exemplary set of captured historical raw business events for a single legal matter. An entire set of events pertaining to a single matter can also represented by this type of life-cycle diagram:

Examples of the event types referenced in TABLE 1 and FIG. 2 are:
A—legal matter created;
R—legal request created;
P—person added to scope;
D—data source added to scope;
H—hold notice created;
CP—collection plan created;
C—collection log created;
Ex—external event occurred (there might be a large number of external event types);
V—virtual interview created;
I—interview log created;
E—export occurred; and
F—matter finished.

A suffix "x" marks subsequent events of a given type that have occurred in the context of a particular matter. For instance, a first collection log is labeled as "C" and a subsequent collection log is labeled as "Cx". A follow-on export is marked as "Ex". An initial External event is marked "Ex".

Business Event Analysis and Transformation (Step 2)

The data captured in step 1 is aggregated and statistically analyzed by matter type and event type. An example of the results of such an aggregation and analysis are tabulated in Table 2. Export Lag is defined as the duration from the occurrence of a given event to the export event E.

TABLE 2

| Matter Type | Event Type | Export Lag, days | Frequency, per matter |
|---|---|---|---|
| Employment | A | 342 | 10 |
| Employment | R | 339 | 15 |
| Employment | P | 337 | 17 |
| Employment | D | 334 | 19 |
| Employment | H | 316 | 30 |
| Employment | V | 289 | 35 |
| Employment | C | 266 | 60 |
| Employment | Ex1 | 212 | 65 |
| Employment | CP | 202 | 50 |
| Employment | E | 0 | 100 |
| Employment | F | −104 | 0 |
| Securities | A | 316 | 10 |
| Securities | R | 312 | 15 |
| Securities | P | 312 | 17 |
| Securities | V | 301 | 19 |
| Securities | D | 298 | 30 |
| Securities | H | 295 | 35 |
| Securities | C | 266 | 60 |
| Securities | Ex1 | 212 | 65 |
| Securities | CP | 202 | 503 |
| Securities | E | 0 | 100 |
| Securities | F | −104 | 0 |

Event weighting provides that the most recent data is weighted more heavily than older data. For example, data from the last two quarters should have a much higher impact on the forecast than data from last year, etc. A technique called exponential smoothing is used for that weighting.

$$S_0 = X_0$$

$$S_t = \alpha X_t + (1-\alpha) S_{t-1}$$

Where $\alpha$ is a smoothing factor with the value ranging from 0 to 1, $S_{t-1}$ is a previous smoothed statistic and $X_t$ is the latest observation value. Exponential smoothing is applied to variety of variables including lag times, volumes of collection, number of people in scope, etc.

Event filtering deals with historical data that has irregular characteristics. Event filtering allows for discarding of events with values outside of an acceptable range. One example of an irregular event occurs when a user performs a test operation or other activity that is not a part of a normal business process and that should not be used for forecasting. Another example of an irregular event occurs when an unusually large volume of collection of a variable falls well outside of the typical range of values for the variable. The method provides a way to exclude from the captured historical event data base events such as test export, collection, etc., that were not intended to be a part of the normal business process and are very unlikely to occur frequently. This approach streamlines event filtering management and improves overall forecasting accuracy.

There is a wide variety of well known statistical techniques that address relationships between variables. Correlation is a popular statistical technique that determines whether a pair of variables are related and how strong is the relationship. For example, the event of creation of the collection log can significantly increase the likelihood of export. Correlation tells us how much bearing the creation of the collection log has on the probability of export. For a person who understands legal processes, this correlation is fairly straight forward, but in reality historical events may have unsuspected correlations. A good understanding of the correlations in the historical data provides improved quality for the forecasting model. The forecasting model of the present invention calculates the correlation coefficient (r), which ranges from −1.0 to +1.0. The idea here is to calculate the strength of the relationship between the fact that an event of a given type has occurred and the probability of the event of export happening. The closer the correlation coefficient is to +1 or −1, the more tightly an occurrence of a given event contributes to the likelihood of export. If r is close to 0, it means there is no relationship between the events.

The number of new legal matters fluctuates from month to month and from one quarter to another. Historical data gathered over a long period of time may clearly show that the number of litigations per quarter tends to increase over time, showing an upward trend. There are a variety of well known statistical methods for analyzing trends. For example, an easy way of detecting a trend involves measuring averages on a quarterly basis. If the averages change over time, we could confirm presence of a trend in the series. An initial trend factor can be calculated based on the following formula:

$$t = 1 \Big/ P\Big(\frac{y_{P+1} - y_1}{P} + \frac{y_{P+2} - y_2}{P} + \ldots + \frac{y_{P+P} - y_P}{P}\Big) \qquad (1)$$

where t is the trend factor P is the number of periods in the season (P=4 quarters per year), and y is the observation. Note that in order to properly establish an initial trend, at least two years worth of data, or 2*P periods is used.

Extrapolate Future Business Events (Step 3)

Figure 5:
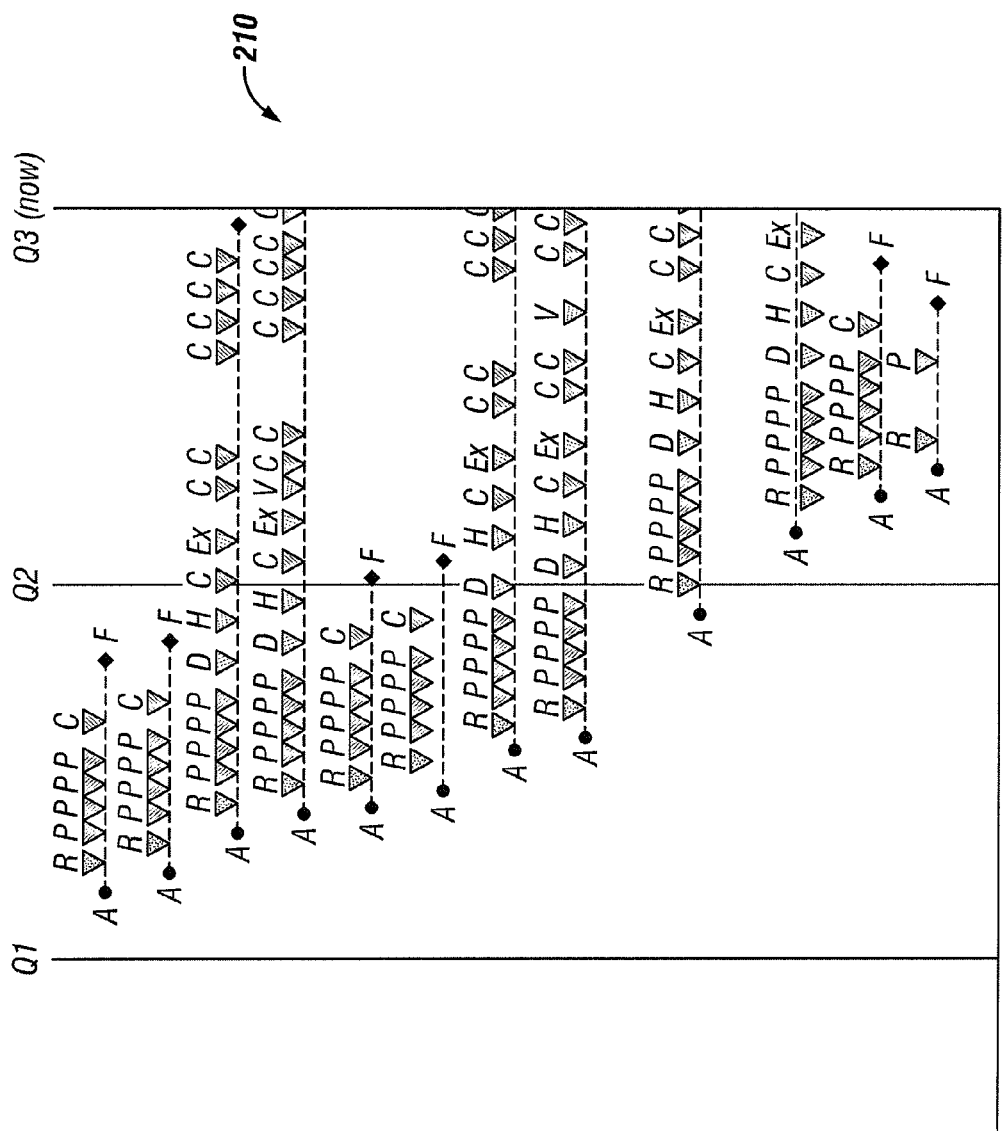
FIG. 5 is a life-cycle diagram illustrating a number of legal matters, some of which are active at the beginning of a forecasting period.

Based on the statistical information produced in previous STEPS 1 and 2, we can now extrapolate business events that are likely to occur in the future within the forecasting period of STEP 3. FIG. 5 is a life-cycle diagram 210 illustrating a number of legal matters, some of which are active at the beginning of a forecasting period. The figure shows five active litigations at the beginning of the forecasting period at the beginning of Q3.

The method of the present invention uses statistical data produced in STEP 2 to calculate probabilities of occurrence of business events for a given matter. The event that we are the most interested in is the export event E because most of the discovery costs are incurred at the export event E. The method of the present invention extrapolates the occurrence of events that are likely to happen during the forecasting period, including the likelihood of export.

One implementation of the model for extrapolating the future events on existing matters is based on a well known forecasting methods that include but are not limited to: time-series methods, including time-series decomposition and Box-Jenkins, smoothing methods, discrete distribution models, and regression or econometric methods. One variation of a smoothing method, called triple exponential smoothing, can be used for data smoothing. Triple smoothing provides overall smoothing followed by trend and seasonal smoothing.

Figure 6:
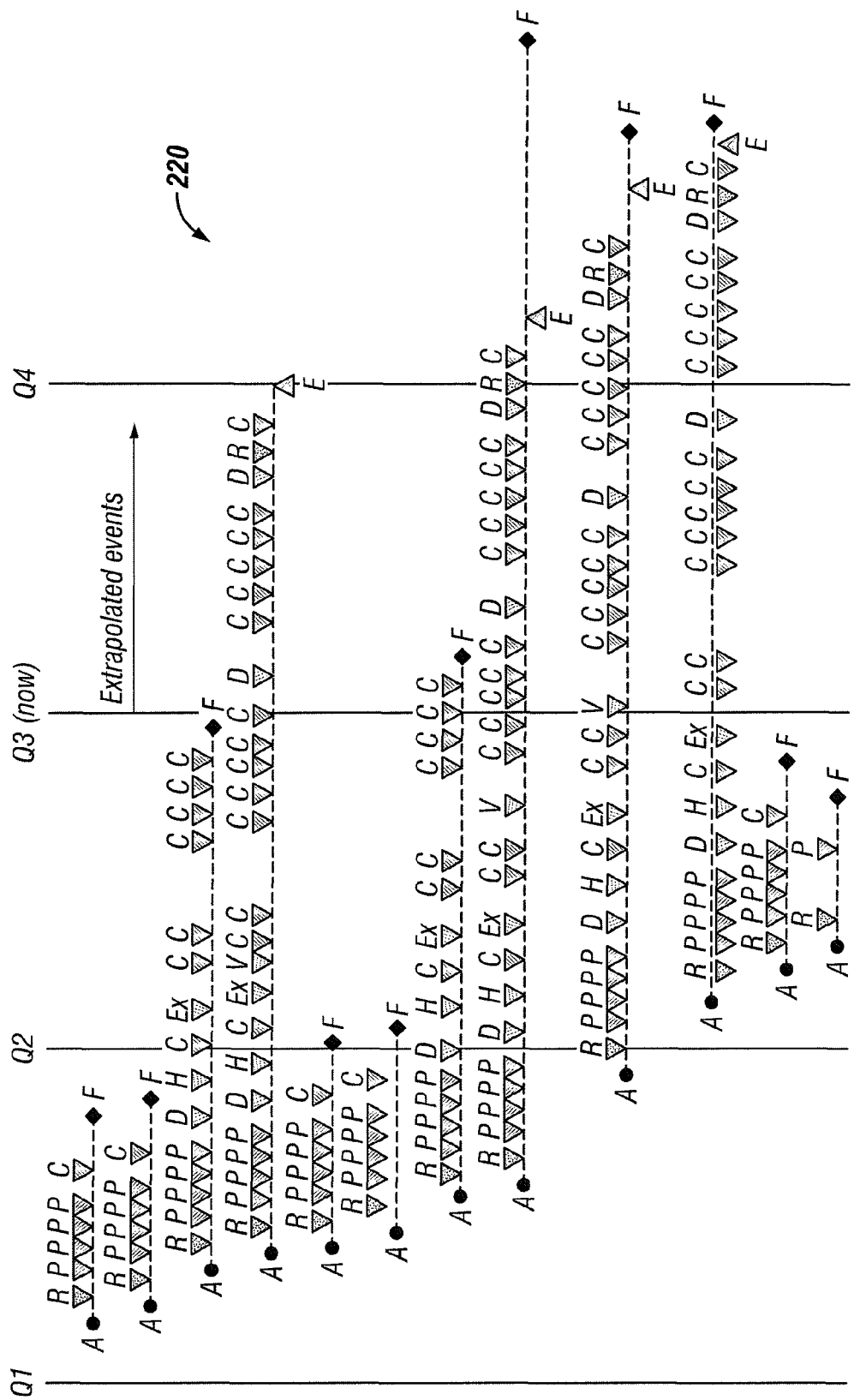
FIG. 6 is a life-cycle diagram illustrating the legal events of FIG. 5 and also including extrapolated events for the legal matters that are active at the beginning of the forecasting period.

The extrapolated events from this type of smoothing may look like those shown on FIG. 6. FIG. 6 is a life-cycle diagram 220 that illustrates the legal events of FIG. 5 and that also includes extrapolated, future events for the legal matters that are active at the beginning of the forecasting period.

Forecasting Future Matters (Step 4)

We now can extrapolate creation of new matter events within a forecasting period. The model contains probabilistic data on the occurrence of a new "Legal Matter Created" event (A), which is essentially a time series with quarterly periodicity. For instance, for the "Employment" matter type, the distribution of new matters can be expressed using 10th, 50th, and 90th percentiles with the values of 54, 121 and 213. Assume that for this type of event the model identified has a steady upward trend with a 6% increase quarter over quarter. There is also seasonal component of the model that indicates a 2% downward pattern for the duration of the forecasting period. There is a wide variety of well known statistical methods listed above that can be applied to the model to forecast future matters. Triple exponential smoothing takes into account trend and seasonal patterns of events.

$$F_{t+k} = (L_t + k^*T_t)^* S_{t+k-c} \qquad (2)$$

where $L_t$ is the estimate of the base level at time t, k is the number of time periods in the forecast, $T_t$ is the trend, c is the number of periods in the seasonal pattern (four quarters or twelve months), and $S_{t+k-c}$ is the seasonal index at time. There are smoothing constants used for smoothing equations that get adjusted as part of the forecast calibration.

A triple exponential smoothing forecasting model can be used since it has an advantage over the other time series methods such as single and double exponential smoothing method because it takes into account trends and seasonality in the data. In addition, past observations are given exponentially smaller weights as the observations get older. In other words, recent observations are given relatively more weight in forecasting than the older observations. Also included are a base level $L_t$, a trend $T_t$ as well as a seasonality index $S_t$.

Four equations are associated with triple exponential smoothing:

$L_t = \alpha^*(X_t/S_{t-c}) + (1-\alpha)^*(L_{t-1} + T_{t-1})$, where L, is the estimate of the base value at time t and α is the constant, used to smooth $L_t$;

$T_t = \beta^*(L_t - L_{t-1}) + (1-\beta)^*T_{t-1}$, where $T_t$ is the estimated trend at time t and p is the constant used to smooth the trend estimates;

$S_t = \chi^*(X_t/L_t) + (1-\chi)^*S_{t-c}$, where S, is the seasonal index at time t, χ is the constant used to smooth the seasonality estimates, and c is the number of periods in the season. For example, c=4 for the quarterly data; and And finally the forecast at the time t for the period t+k is $F_{t+k} = (L_t + k^*T_t)^* S_{t+k-C}$ Initial values for $L_t$, $T_t$, and $S_t$ can either be entered into the system or alternatively can be derived from the data. At least two cycles of data are typically required to properly initialize the forecasting model.

Based on the approach above, the future matters are estimated including: the number of new matters created within the forecasting period based on the new matter average, trends, and possible seasonal fluctuations. Future events on these matters are estimated using methodology described in the STEP 3.

Figure 7:
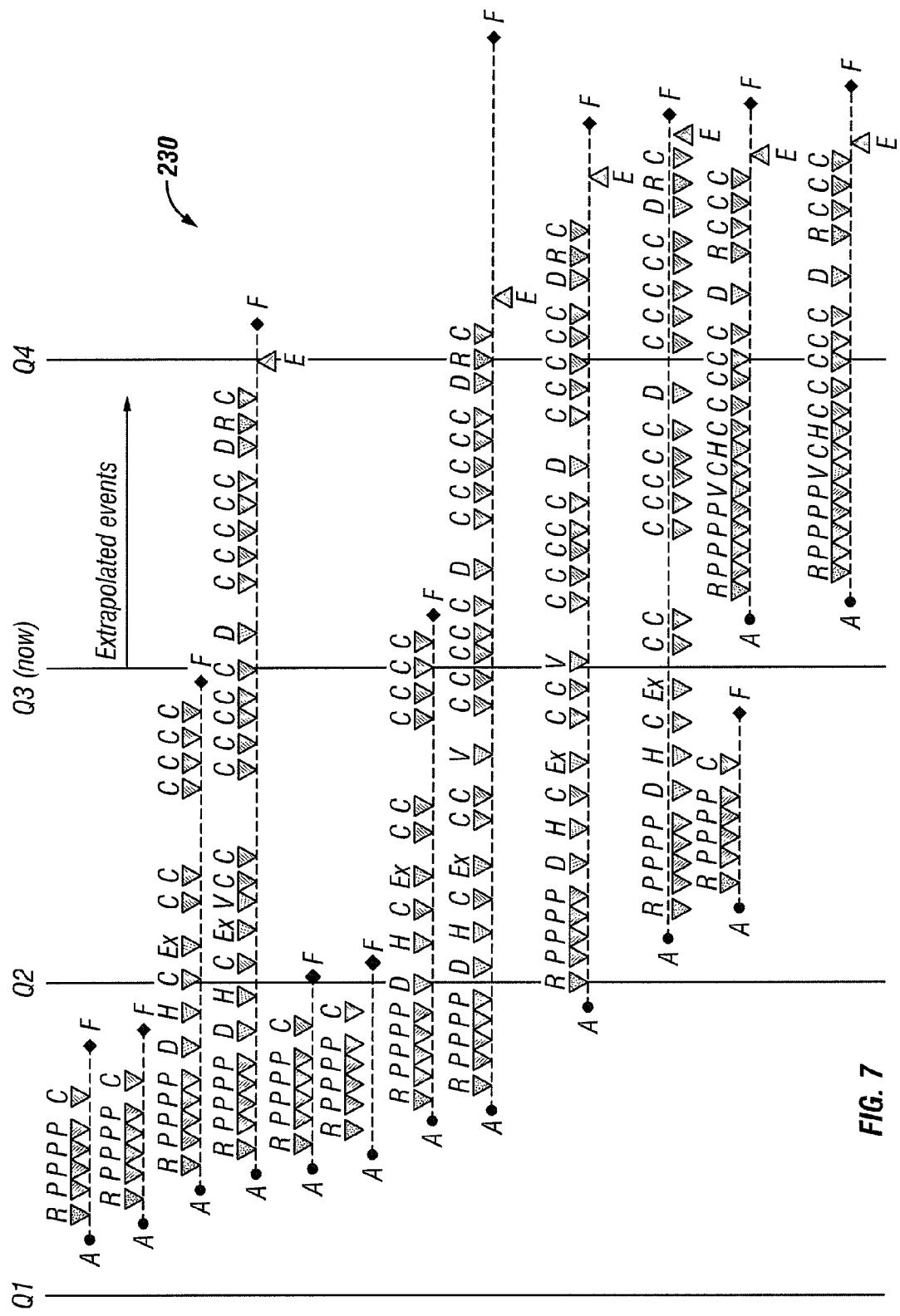
FIG. 7 is a life-cycle diagram illustrating the legal events of FIG. 5 and also including two new estimated matters along with their future events.

FIG. 7 is a life-cycle diagram that illustrates the legal events of FIG. 6 with the addition of two new estimated matters along with their future events.

Forecasting the Volumes of Production (Step 5)

The method extrapolates the quantitative characteristics of the collection scope at the time of the forecasted export to forecast the volume of production for a forecasted export event. One implementation estimates volume of production using the following methodology: forecasting the number of custodian and data sources for the matters in which the "export" event E is likely to occur during the forecast period; applying typical collection size per custodian and data source; estimating typical make up of the collection in terms of file types, e.g. 60% emails, 20% ms office documents, 10% txt files etc.; and applying GB/page mapping described below to the collected volume according to the collection make up ratio to estimate the size of the collections in pages.

Collections can contain a large number of various types of files. The number of pages per gigabyte of data varies dramatically based on the type of file. For instance, a txt file or a Microsoft (MS) Excel file may be small in sizes but would likely result in large number of pages On the other hand emails may be large in size but result in a small number of pages. The method addresses this issue by introducing a simple GB/page mapping that defines average number of pages per GB of collected data for a specified document type.

Table 3 shows average pages per gigabyte for various document types.

TABLE 3

| Document Type | Average Pages./GB |
| --- | --- |
| Microsoft Word | 65,000 |
| Email | 100,100 |
| Microsoft Excel | 166,000 |
| Lotus 1-2-3 | 290,000 |
| Microsoft PowerPoint | 17,500 |
| Text | 678,000 |
| Image | 15,500 |

Cost Forecast (Step 6)

A cost for future discovery is derived from the extrapolated collection volume calculated in the previous STEP 5 by applying a culling rate and average review cost. The review costs are typically estimated based on the number of pages produced, where culling rate and review rate are measured in $/page. An implementation of a method to estimate the discovery cost, based on extrapolated collections volume, is described below. For matters where the detailed collected data is not known yet, an average blended page count/GB value is used to convert the estimated data collected volume into a projected page count.

Once a matter reaches the collection stage, the total volume is extrapolated based on current volume and additional expected collection. The page count equivalent is computed based on the kind of files that are collected. Once the number of pages exported has been estimated, the FE generates estimated cost numbers along with a measure of the forecast accuracy described below.

Forecast Accuracy

Forecast accuracy is measured and calculated based on the predicted and observed data using the following equation:

$$\text{Accuracy} = 1 - \frac{\sum \frac{A_t - F_t}{A_t}}{n} \quad (3)$$

Where
$A_t$ is the actual cost in the interval t
$F_t$ is the forecasted costs for the interval t Model Calibration The forecasting model is designed to become more accurate over time. This is achieved though the ability to compare the forecasted and actual export volume and review costs and to make appropriate provisions and adjustments to calibrate the forecasting model and the historical data.

FIG. 8 is a user interface such as a data entry screen 300 for a user interface that enables a user to manually adjust major parameters of the forecasting model. Various entry windows are provided for user entry. An entry window 302 is provided a user estimation of likelihood of production actually occurring. A group 304 of entry windows is provided for a user's estimates of the duration of a matter before first export is required. The estimates are in years, months, and days for estimates of 10%, average, and 90%. A group 306 of entry windows is provided for a user's estimates of the volume of export from data sources. These volume estimates are in megabytes (MB) with estimates of 10%, average, and 90%. Another group 308 of entry windows is provided for a user's estimates of the volume of export from custodians. An entry window 310 is provided for a user's estimation of culling rate per cent.

FIG. 9 shows another user data entry screen 320 for a user interface that enables a user to manually adjust parameters of an individual matter by entering values into one or more user entry windows that are selected with corresponding checkboxes. An entry window 322 is selected to modify the percent of likelihood of production. An entry window 324 is selected to modify the estimated date of production. An entry window 326 is selected to modify the number of estimated custodians. An entry window 328 is selected to modify the number of estimated data sources. An entry window 330 is selected to modify the estimated volume in GB. An entry window 332 is selected to modify the estimated total cost. In the Figure, window 322 has been modified with a different percentage and window 324 has been selected for a user to enter another date. The parameters provided by the forecasting model are estimated and a user with enough knowledge can elect to override the estimates with better information to improve forecasting accuracy.

Data can also be captured from third party systems such as billing and financial systems used for handling payments to external partners. That data is streamlined into the historical database. This can be used to further increase the accuracy of the cost forecasting by correlating review costs to the event of export and increasing the consistency and integrity of the billing data. A possible implementation of the method to integrate with third party billing system would allow importing the billing and other financial information from outside counsels and review companies information on the regular basis into the forecasting knowledge base. The information is also used for automatic model calibration based on the forecasted costs and actual costs pertaining to discovery billed by third party vendors.

Important attributes of an effective model for forecasting discovery costs are ease of use, flexibility and data integrity. The forecasting model embodied in the present invention enables a person with little or no training in finance to produce a forecast that is confident in delivering to a company's management team. Because the data used to create the forecast is complete and specific to the company and was collected in a way that minimizes the risk of human error.

Reports

A system according to the present invention automatically collects and analyzes the data identified above and can automatically creates a cost predictability report. If the system accesses all of the data, it can compile the historic data and produce a forecast of cost by quarter.

Figure 10:
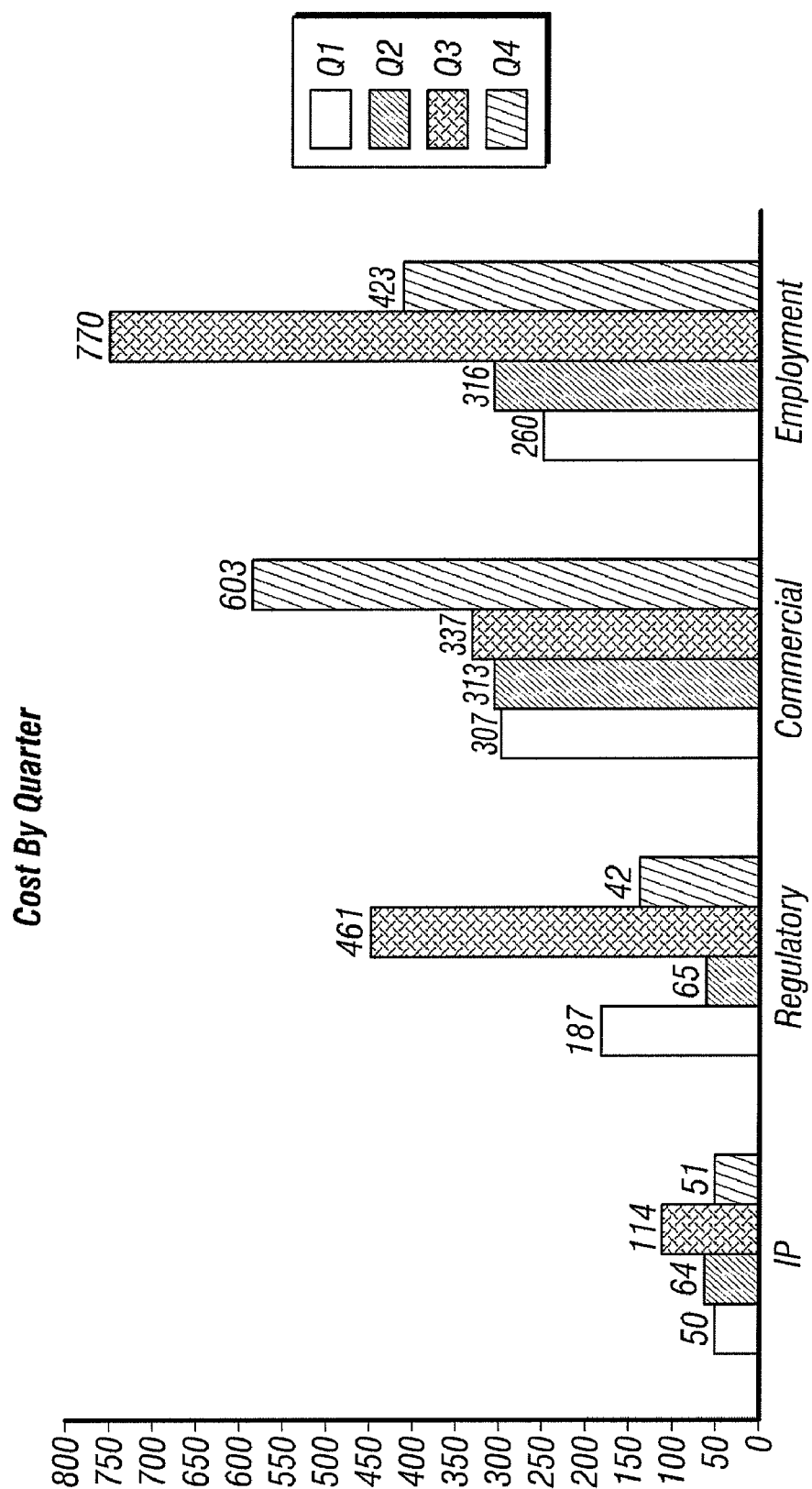
FIG. 10 is a bar chart illustrating cost by quarter for four different types of matters.
Figure 11:
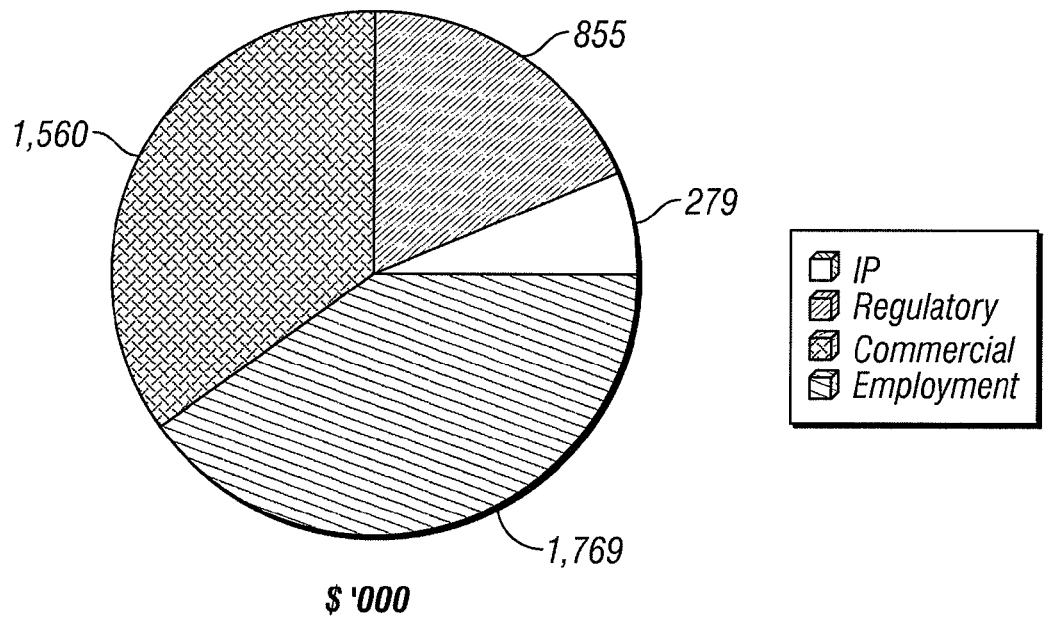
FIG. 11 is a pie chart illustrating a yearly estimate of discovery costs for the four different types, of matters illustrated in FIG. 7.

FIG. 10 shows a bar chart reporting the costs for each quarter for each of four different types of matters, such as intellectual property (IP) matters, regulatory matters, commercial matters, and employment matters. FIG. 11 shows a pie chart reporting a yearly estimate of discovery costs for the four different types of matters illustrated in FIG. 10.

Figure 12:
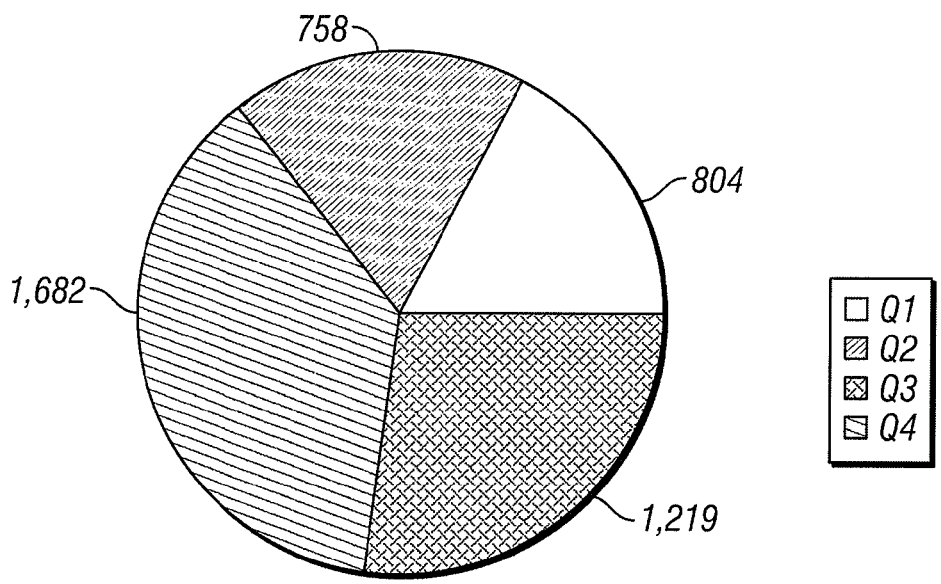
FIG. 12 is a pie chart illustrating the yearly distribution of quarterly expenses.

FIG. 11 provides a comparison of the costs for the four types of matters. FIG. 12 is a pie chart illustrating the yearly distribution of quarterly expenses.

FIG. 12 provides a comparison of the quarterly costs. Reports can show costs, for example, by matter type, business unit to which costs may be allocated, and responsible attorney.

At any point in time, the forecasting model is able to produce a forecast that looks forward for a specified time period. By looking at changes in the data over time, reports are produced showing changes in the data such as changes in the percentage of matters that move from stage to stage or the average time it takes to progress, improvements in culling rates, increases in review costs, etc.

The ideal system automatically collects and analyzes the data identified above and automatically creates a cost predictability report. If the system accesses all of the data, it can compile the historic data and produce a forecast of cost by quarter. The report should include the ability to show cost by matter type, business unit (if the company allocates litigation cost), and responsible attorney. Below is a sample report showing projected quarterly expenses by matter type and total projected expenses by matter type for the next fiscal year.

At any point in time the model should be able to produce a forecast looking forward for a specified time period. By looking at changes in the data over time, the solution can produce reports showing changes in the data such as changes in the percentage of matters that move from stage to stage or the average time it takes to progress, improvements in culling rates, increases in review costs, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A computer-implemented method of forecasting litigation discovery costs for a litigation matter that includes a number of business events, comprising:

capturing historical business events for the litigation matter;

aggregating the historical business events, with an aggregation module, and statistically analyzing the captured historical business events by matter type, time period, and business event type to produce statistical data specific to a time period;

aggregating the statistical data for matter type and event type;

extrapolating future business events using the statistical data provided by the statistical analysis to calculate probabilities of occurrence of future business events;

forecasting an extrapolated volume of production at the time of a forecasted export event, wherein an export event is an event representing when a document page is being exported; and forecasting costs for future discovery from the extrapolated volume of production by applying a culling rate and average review cost.

2. The method of claim 1, wherein the statistical data includes Export Lag, which is the time duration from an occurrence of a given event to an export event.

3. The method of claim 2, wherein the statistical data includes a statistical distribution export lag for event types within the matter type.

4. The method of claim 1, including providing a probability of export, which is the likelihood of the export event occurring after an event of a given type has occurred in the context of a legal matter.

5. The method of claim 1, wherein aggregating the statistical data for matter type and event type is across multiple fiscal periods to provide trend and seasonal analysis.

6. The method of claim 1, wherein the step of aggregating and statistically analyzing the captured historical business events by matter type and business event types to produce statistical data includes event weighting in which recent data is weighed more heavily that older data.

7. The method of claim 1, wherein aggregating and statistically analyzing the captured historical business events by matter type and business event types to produce statistical data includes event filtering that discards events with values outside of an acceptable range and events from the matters identified as abnormal.

8. The method of claim 1, wherein extrapolating future business events using the statistical data provided by the statistical analysis to calculate probabilities of occurrence of future business events includes a weighed extrapolation algorithm in which recent events are given relatively more weight in forecasting than older events.

9. The method of claim 1, wherein forecasting an extrapolated volume of production at the time of a forecasted export event includes forecasting the number of custodians and data sources involved in collections based on the actual number of custodians and data sources in the scope of the matter.

10. The method of claim 1, wherein forecasting an extrapolated volume of production at the time of a forecasted export event includes computing the probability of the export within the forecasting period based on the historical event patterns.

11. The method of claim 1, wherein forecasting an extrapolated volume of production at the time of a forecasted export event includes applying a collection size per custodian and data source.

12. The method of claim 1, wherein forecasting an extrapolated volume of production at the time of a forecasted export event includes estimating typical make up of the collection in terms of file types.

13. The method of claim 1, including calibrating the method by making provisions and adjustments to one or more parameters of a forecasting model.

14. The method of claim 1, performing matter cost modeling for various scenarios by adjusting parameters of a forecasting model.

15. The method of claim 1, including creating reports for forecasting an extrapolated volume of production at the time of a forecasted export event.

16. The method of claim 1, including creating reports for forecasting costs for future discovery from the extrapolated volume of production.

17. The method of claim 1, including creating reports for forecasting costs for future discovery from an extrapolated volume of production.

18. A computer-implemented method of forecasting litigation discovery costs for a litigation matter that includes a number of business events, comprising:

capturing historical business events for the litigation matter;

aggregating the historical business events, with an aggregation module, and statistically analyzing the captured historical business events by matter type, time period, and business event type to produce statistical data specific to a time period;

aggregating the statistical data for matter type and event type;

extrapolating future business events using the statistical data provided by the statistical analysis to calculate probabilities of occurrence of future business events;

forecasting an extrapolated volume of production at the time of a forecasted export event, wherein an export event is an event representing when a document page is being exported; and forecasting costs for future discovery from the extrapolated volume of production;

wherein forecasting an extrapolated volume of production at the time of a forecasted export event includes applying typical collection-to-export volume ratio to estimate the volume of export.

19. A computer-implemented method of forecasting litigation discovery costs for a litigation matter that includes a number of business events, comprising:

capturing historical business events for the litigation matter;

aggregating the historical business events, with an aggregation module and statistically analyzing the captured historical business events by matter type, time period, and business event type to produce statistical data specific to a time period;

aggregating the statistical data for matter type and event type;

extrapolating future business events using the statistical data provided by the statistical analysis to calculate probabilities of occurrence of future business events;

forecasting an extrapolated volume of production at the time of a forecasted export event, wherein an export event is an event representing when a document page is being exported; and forecasting costs for future discovery from the extrapolated volume of production;

wherein forecasting an extrapolated volume of production at the time of a forecasted export event includes applying a gigabyte per page mapping to the collected volume according to the collection make up ratio to estimate the size of the export in pages.

\* \* \* \* \*